United States Patent Office 3,388,854
Patented June 18, 1968

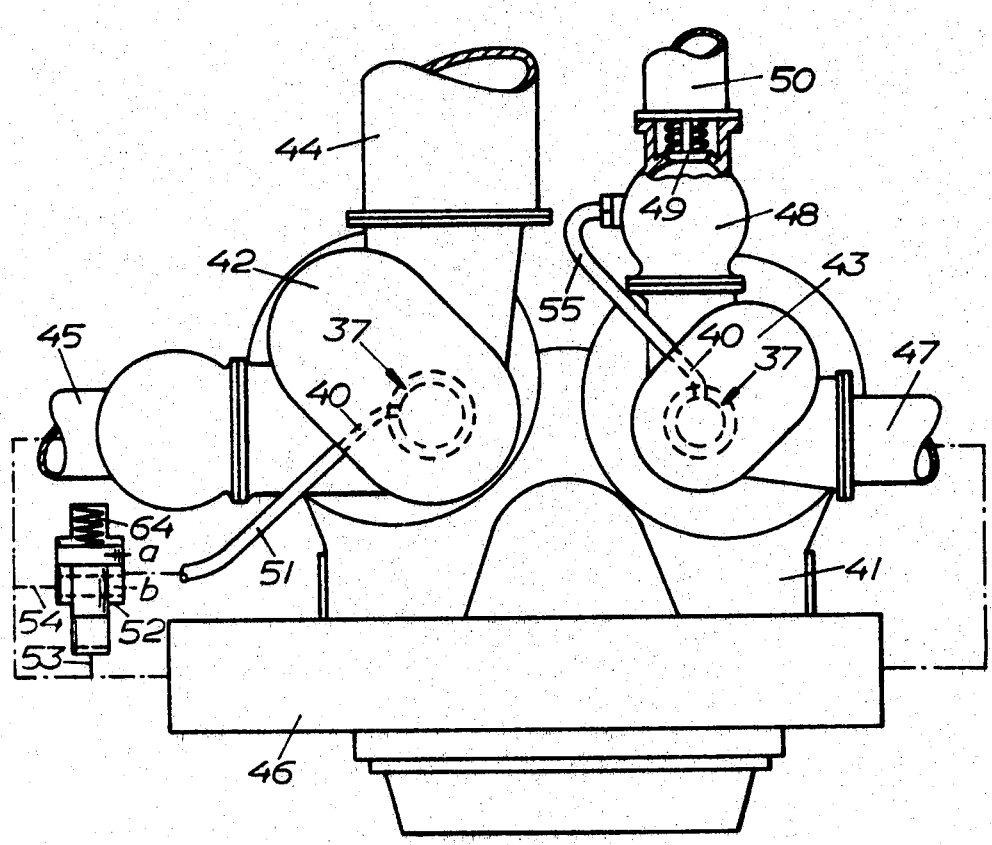

3,388,854
THRUST BALANCING IN ROTARY MACHINES
Hans Kristofer Olofsson, Segeltorp, and Sven Ivar Trulsson, Nacka, Sweden, assignors to Atlas Copco Aktiebolag, Nacka, Sweden, a corporation of the Kingdom of Sweden
Filed June 23, 1966, Ser. No. 564,473
9 Claims. (Cl. 230—143)

This invention relates to rotary machines comprising a housing with inlet and outlet passages and inlet and outlet ports for a working fluid, a rotor mounted for rotation in said housing for operation on said working fluid, and antifriction bearings in said housing for rotatably mounting said rotor and capable of taking axial thrust. Rotary machines of this type may be turbines, pumps, motors, compressors, meters and the like which may be working on gaseous fluid or on liquid as the case may be. Such rotary machines may have a single rotor or two or more rotors cooperating with one another. The invention is particularly intended for high speed rotary machines of the above type, and the invention has been found particularly useful in connection with screw rotor machines such as screw compressors or motors. In machines of the above type the fluid pressure acting on the rotor or rotors often results in an undesirable load on the rotor bearings. One object of the invention is to obtain an even distribution of the load on the antifriction bearings for the rotor or rotors. Another object of the invention is to partially reduce the load on the antifriction bearings and particularly the thrust bearings having the greatest load so that the duration of service of such bearings may be prolonged to satisfactory practical values. A still further object of the invention is to increase the efficiency particularly of screw rotor machines of the types described by making possible a reduction of the necessary clearances between the rotor or rotors and the housing in which said rotor or rotors are mounted. For the above and other purposes we provide a thrust balancing cylinder in the housing, a thrust balancing piston movable in said cylinder and acted upon by pressure fluid to exert axial thrust on the rotor in one axial direction, and spring means in the housing arranged to exert axial thrust on the rotor in an opposite direction, said spring bias being sufficient always to hold the rotor in said opposite direction. The invention will be described hereinbelow in connection with one embodiment which is illustrated by way of example and which comprises a screw rotor compressor and another embodiment showing a two stage screw compressor. The invention may be modified, however, in several different ways within the scope of the claims.

Figure 1:
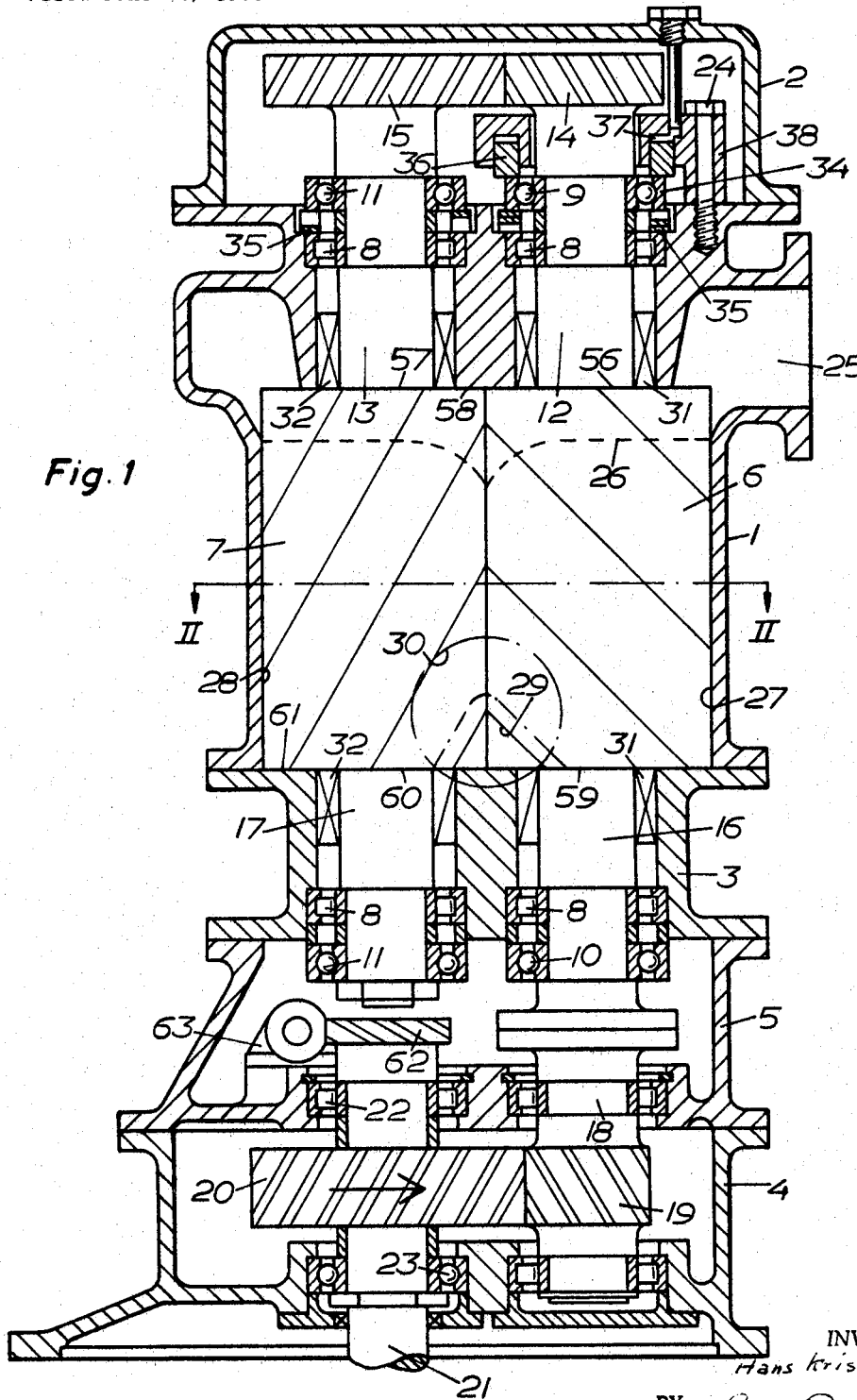
Figure 2:
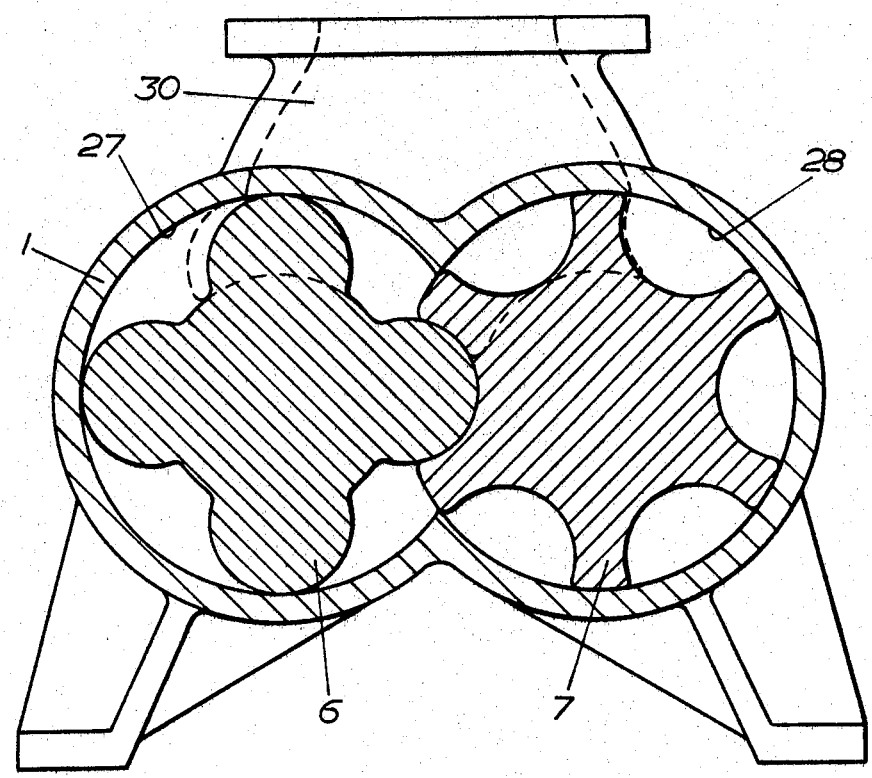
Figure 3:
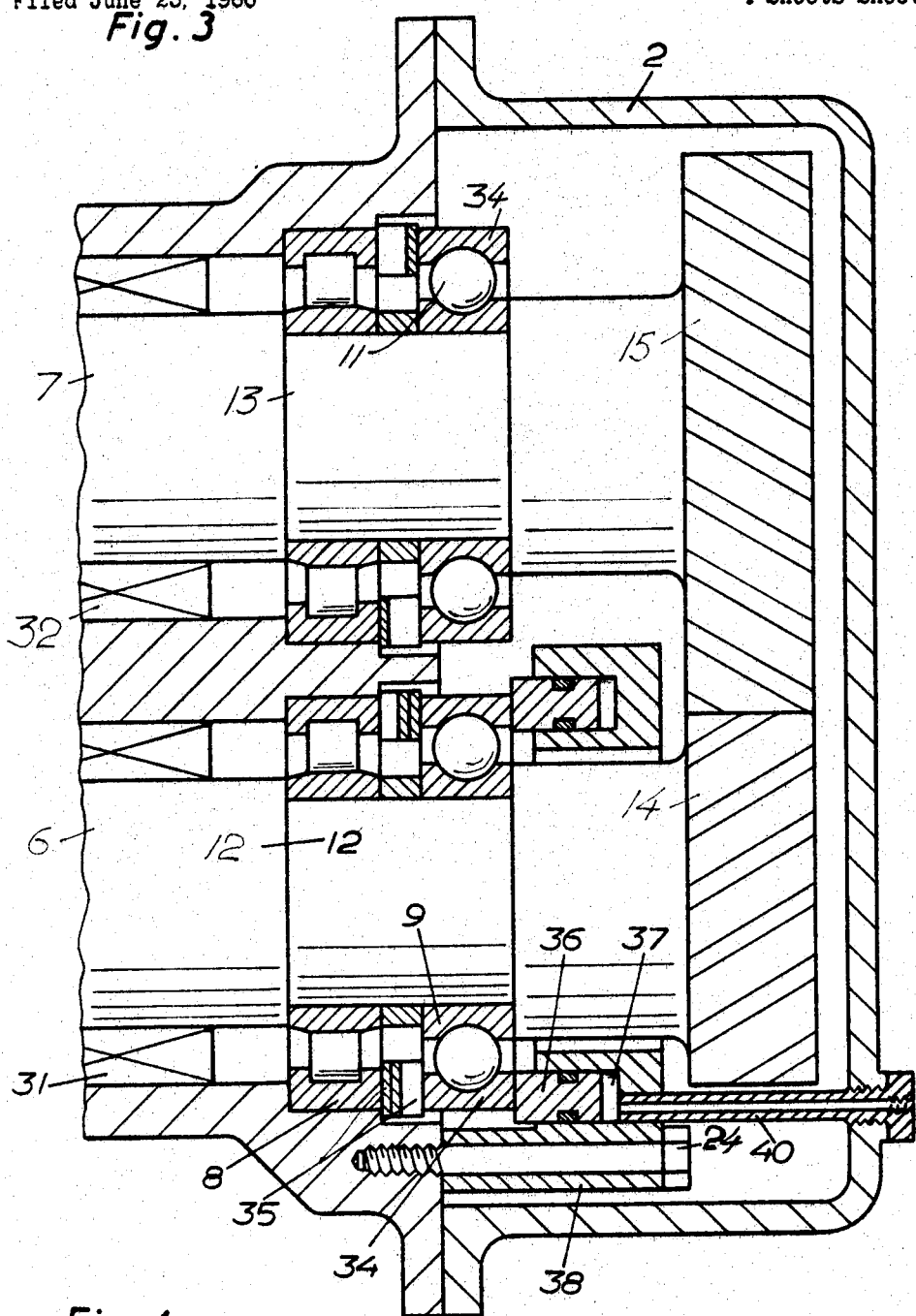
Figure 4:

In the accompanying drawings FIG. 1 is a longitudinal axial section of a screw rotor compressor of the single stage type. FIG. 2 is a cross section on a somewhat larger scale of the compressor according to FIG. 1 on line II—II in FIG. 1, and FIG. 3 is a partial longitudinal section of the synchronizing end of a compressor similar to the compressor in FIG. 1. FIG. 4 is a perspective view of a spring for use in the compressor of FIGS. 1–3. FIG. 5 is a diagrammatic end view of a two stage compressor according to the invention.

The screw rotor compressor illustrated in FIGS. 1–3 has a housing which consists of a rotor housing 1, a synchronizing gear housing 2 bolted to one end of said rotor housing and forming an end cover, a bearing housing 3 bolted to the housing 1 and a drive gear housing 4 and an intermediate housing 5. A main screw rotor 6 and a gate screw rotor 7 with intermeshing helical threads and grooves are mounted for rotation in the housings 1, 3 in roller bearings 8 and ball bearings 9, 10 and 11, said ball bearings being arranged for taking up the axial thrust from the rotors 6 and 7, respectively. Naturally the bearings 9, 10 and 11 may be other types of antifriction bearings fit for taking axial thrust such as angle ball bearings, conical bearings, or the like. The main and gate rotors cooperate with one another and with the walls of the housing 1 to define pockets for the working fluid moving from the inlet to the outlet. The rotors are provided with trunnions 12 and 13 at one end carrying synchronizing gears 14 and 15 which are formed as cylindrical helical gears. At the opposite ends of the rotors trunnions 16 and 17 are provided and preferably the trunnion 16 is coupled to a shaft 18 carrying a cylindrical helical pinion 19 which is driven by a cylindrical helical drive gear 20 mounted on a shaft 21 carried in a bearing 22 and a bearing 23 capable of taking the axial thrust of the drive gear 20. The direction of rotation of the helical drive gear 20 is indicated by an arrow. The shaft 21 is driven by a not illustrated motor which drives the shaft 21 through a not illustrated coupling, which may be a disengageable coupling, for instance a pressure fluid operated centrigual coupling. The arrangement of the driving gear 20 and the pinion 19 is such that during operation of the compressor an axial thrust is obtained on the pinion 19 which is directed downwards in FIG. 1 of the drawing. 62 is a pinion on the shaft 21 which drives an oil pump 63 which may provide pressure oil for lubrication and/or for sealing and cooling the compressor or for other purposes.

The compressor is provided with an inlet passage 25 leading to an inlet port 26 providing a radial and axial inlet to the two intersecting parallel bores 27, 28 for the screw rotors. The compressor is furthermore provided with an outlet port 29 and an outlet passage 30 which may be connected to a consumer or to an intermediate cooler when the compressor forms a part of a two or multiple stage compressor plant. The passage 30 may also lead directly to the high pressure stage of a two-stage compressor. 31 and 32 are shaft seals. The outer race 34 of the ball bearing 9 of the main rotor is axially slidable subject to the action of a ring-shaped double spring 35, one of which is illustrated in detail in FIG. 4, and a balancing piston 36 which is movable in a thrust balancing cylinder 37 which is formed in a cylinder casing 38 bolted to the rotor housing 1 by bolts 24. The spring 35 is a wave ring type spring but other types may be used as the case may be, for instance a set of helical springs. The outer race 34 of the gate rotor ball bearing 11 at the synchronizing end is movable axially subject to the action of a single spring 35 and any rotor movement. The thrust balancing cylinder 37 communicates through a pipe connection 40 with a pressure fluid source (not shown). In oil flooded screw compressors said pressure fluid source may be the cooling and sealing injection oil source which is under pressure as long as the compressor is operating on load but which is depressurized as soon as the compressor is unloaded or stopped. The pipe connection 40 may also be connected to a source of lubricating oil for the compressor but in such a case a device has to be incorporated in the pipe connection 40, which automatically shuts off the supply of pressure oil to the cylinder 37 when the compressor is unloaded or stopped.

The balancing cylinder 37 may furthermore be connected to a source of compressed air or compressed gas. For this purpose the cylinder 37 may be connected through the pipe connection 40 to an intercooler of a multiple stage compressor or to the compressor delivery conduit upstream of any check valve.

The spring 35 and the balancing piston 36 during normal operation of the compressor distributes the axial thrust on the bearings 9 and 10 of the main rotor more evenly than in conventional screw compressors so that the useful duration of service of these bearings is much increased. The invention has also the advantage that the clearance between the high pressure end surfaces 59, 60 of the rotors and the end wall 61 of the compressor housing which is of great importance for the efficiency of the compressor may be kept at a low value and only sufficient to provide a running clearance necessary for taking care of uneven thermal expansion of the cooperating parts of the compressor and manufacturing tolerances. Since the compressor rotors are always held upwards in FIG. 1 the clearance between the surfaces 59, 60 and 61 may be reduced with the amount of clearance in the ball bearings of a conventional compressor of this type in which the rotors during some operating conditions move down in FIG. 1 and under other conditions upwards in said figure. In other words the invention makes it possible to neglect the axial bearing clearance when defining the necessary axial clearance between the rotors and the end wall 61. The invention therefore results in a reduced load on the ball bearings and a reduced clearance at the high pressure end of the compressor which increases the efficiency of the compressor.

In the embodiment of FIG. 5, 41 is a power transmission casing on which a low pressure screw compressor 42 and a high pressure screw compressor 43 are mounted, which screw compressors in general arrangement are similar to the illustration in FIGS. 1–4 the gear 20 being common for both compressors for driving their pinions 19. 44 is the inlet pipe to the low pressure compressor 42 which through a pipe 45 is connected to an intercooler 46 which through 47 is connected to the inlet of the high pressure compressor 43. The high pressure compressor 43 is connected with its outlet to a discharge conduit 48 which over a check valve 49 is connected to a delivery pipe 50. Both compressors have inlet and outlet conduits arranged at right angles to each other and at substantially 45° to the common rotor axes plane of each compressor. The balance cylinder 37 of the low pressure compressor 42 is connected through the pipe connection 40 to a pipe 51 leading to a valve 52 which can take two positions *a* and *b* and which is preferably actuated by intercooler pressure through a pipe 53 acting on the valve member against a spring 64. Under normal operation of the compressor with full intermediate pressure in the intercooler 46 the valve 52 is maintained in position *a* in which pressure fluid such as compressed air from the intercooler through a pipe 54 branched off from pipe 45 flows through valve 52 into balance cylinder 37 of the low pressure screw compressor 42 to act against spring 35 on the outer race 34 of the bearing 9. When the compressor is unloaded intercooler pressure sinks below atmosphere and the spring 64 then moves valve 52 to position *b* in which the balance cylinder 37 is vented to the atmosphere and the communication between pipes 54 and 51 interrupted.

The high pressure screw compressor 43 has a pipe connection 40 from the balance cylinder 37 connected through a pipe 55 to the high pressure discharge conduit 48 below the check valve 49. When the screw compressor is running unloaded and pressure is reduced in 48 and then the pressure on the balance piston 36 is reduced with the same amount.

The invention above described and illustrated on the drawings may be modified in several different ways within the scope of the following claims.

What we claim is:

1. A rotary machine comprising a housing with inlet and outlet passages and inlet and outlet ports for a working fluid, a rotor mounted for rotation in said housing for operation on said working fluid, antifriction bearings in said housing for rotatably mounting said rotor and capable of taking axial thrust, a thrust balancing cylinder in the housing, a thrust balancing piston movable in said cylinder and acted upon by pressure fluid to exert axial thrust on the rotor in one axial direction, and spring means in the housing arranged to exert axial thrust on the rotor in opposite direction, said spring bias being sufficient to always hold the rotor in said opposite direction.

2. A rotary machine comprising a housing with a bore and inlet and outlet passages and inlet and outlet ports for a working fluid communicating with said bore, a rotor mounted for rotation in said bore in said housing and operating on said working fluid and mounted in antifriction bearings and subjected to an axial thrust originating from the pressure of the working fluid on said rotor, a thrust balancing stationary cylinder in the housing and a nonrotating balancing piston axially movable in said cylinder and acted upon by the working fluid and arranged to give the rotor a power bias opposite said axial thrust, and spring means acting on the rotor in axially opposite direction to said balancing piston and capable of keeping the rotor moved axially towards one end independent of changes in the axial thrust from the working fluid.

3. A screw rotor machine comprising a housing with intersecting parallel bores and inlet and outlet ports and inlet and outlet passages communicating with said bores through said ports, which are arranged adjacent opposite ends of the bores, main and gate rotors mounted for rotation in antifriction bearings in said housing in the bores and having intermeshing helical threads and troughs, said main and gate rotors cooperating to define with one another and with the walls of said bores pockets for a working fluid moving from the inlet ports towards the outlet ports of the housing, said fluid having different pressures in the ports at least when the machine is operating on load, an axial thrust balancing cylinder in the housing and a thrust balancing piston in said balancing cylinder arranged to give at least one of the rotors a power bias opposite the axial fluid pressure bias of the working fluid on the rotors, spring means acting on at least one of the rotors axially in opposite direction to the balancing piston bias and of such size as to keep the rotor axially towards one end independent of changes in other axial forces on the rotor, and a helical gear transmission coupled to one of the rotors the direction of rotation and the hand and lead of the teeth of said gear transmission relative to the hand and lead of the lands of the main rotor being such that an axial thrust is obtained from the transmission which counteracts the spring bias on the rotors.

4. A rotary machine according to claim 1, in which one antifriction bearing provided for mounting the rotor has an inner and an outer race, one of which is nonrotating but axially displaceable in the housing and acted upon by said balancing piston and said spring means in opposite directions.

5. A screw rotor compressor according to claim 3, in which means are provided for conducting working pressure fluid from the outlet passage of the compressor to the balancing cylinder for actuation of the balancing piston.

6. A screw rotor compressor according to claim 3, in which means are provided for conducting pressure oil from a source of oil under pressure to the balancing cylinder for actuation of the balancing piston.

7. A screw rotor compressor according to claim 3, in which pressure fluid is produced by compressing the fluid in at least two compression stages and in which pressure fluid from between two stages is conducted to the balancing cylinder for actuation of the balancing piston.

8. A screw rotor compressor according to claim 3, in which the fluid pressure on the balancing piston is relieved when the compressor is unloaded.

9. A screw rotor compressor according to claim 8, in which a pressure fluid conduit is provided from a pressurized compartment in the compressor to the balancing cylinder and in which a valve is disposed in said conduit which valve connects said compartment with the balancing cylinder when said compartment is pressurized and closes said connection when the compartment is depressurized and then instead connects the balancing cylinder to the atmosphere.

References Cited

UNITED STATES PATENTS

| | | | |
|---|---|---|---|
| 1,218,602 | 3/1917 | Holdaway | 103—128 |
| 1,677,980 | 7/1928 | Montelius | 103—128 |
| 1,698,802 | 1/1929 | Montelius | 91—84 |
| 2,095,167 | 10/1937 | Burghauser | 103—128 |
| 2,095,168 | 10/1937 | Burghauser | 103—128 |
| 2,176,787 | 10/1939 | Burghauser | 103—128 |
| 2,266,820 | 12/1941 | Smith | 230—143 |
| 2,590,561 | 3/1952 | Montelius | 103—128 |
| 2,592,476 | 4/1952 | Sennet | 103—128 |
| 3,161,349 | 12/1964 | Schibbye | 230—143 |
| 3,275,226 | 9/1966 | Whitfield | 230—143 |

DONLEY J. STOCKING, *Primary Examiner.*

WILBUR J. GOODLIN, *Examiner.*